Jan. 10, 1956  C. L. STABEN  2,730,326
VALVES FOR FROST-PROOF YARD HYDRANT
Filed March 28, 1950
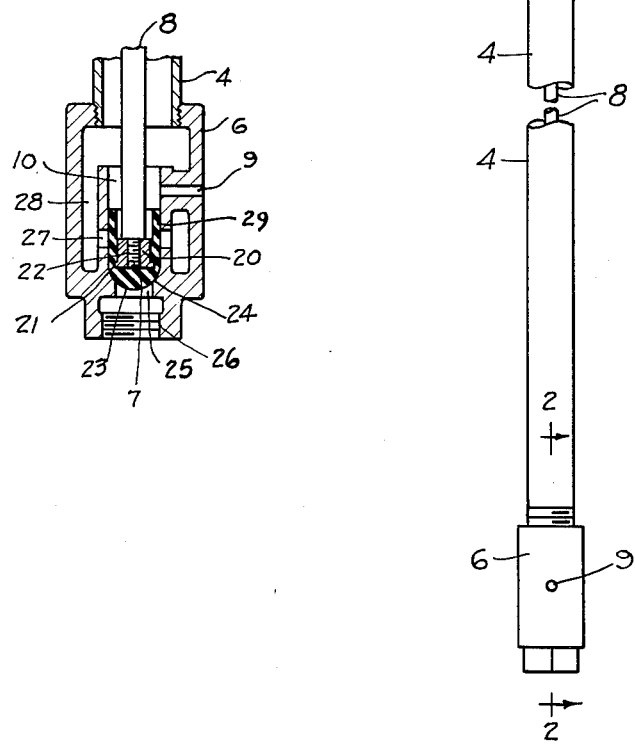
Inventor
CARLTON L. STABEN
Atty

United States Patent Office 2,730,326
Patented Jan. 10, 1956

2,730,326

VALVES FOR FROST-PROOF YARD HYDRANT

Carlton L. Staben, Freeport, Ill., assignor to Modern-Woodmanse Manufacturing Company, a corporation of Illinois Application March 28, 1950, Serial No. 152,317

1 Claim. (Cl. 251—358)

This invention relates to a new and improved valve construction especially designed for use in a frost-proof yard hydrant.

The general construction of this type of yard hydrant is old, the same being designed to permit shutting off the water below the frost line, the water in the standpipe, when the hydrant is shut off, being allowed to escape automatically through a drain hole in the valve chamber that is disposed at the low level of the shut-off valve. My invention is directed primarily to improvements in the construction of the reciprocable valve element, the same, in accordance with my invention, having a body of one-piece molded rubber construction and having only a brass plug insert therein which is threaded for direct connection with the manually reciprocable control rod, thereby obviating the necessity for a separate valve rubber or gasket and eliminating the usual retaining screw and washer that were apt to get loose and drop off, thereby releasing the valve rubber and making it necessary to dismantle the whole hydrant to fix it. These difficulties are avoided with my improved construction, because the valve, being threaded directly onto the control rod, is always withdrawable intact from the valve chamber with said rod if it gets worn out and requires replacement. The molded one-piece rubber valve body acts as a fuller ball making a water-tight seal on the seat in the closed position, and the shank portion of the body, which fits snugly but slidably in the bore of the valve chamber, effectively seals the drain hole in the open position of the valve so that no water is apt to be wasted through this hole when the hydrant is open.

The invention is illustrated in the accompanying drawing, in which—

Fig. 1 is a side view of a frost-proof yard hydrant assembly consisting of a cast iron head carried on the upper end of a galvanized steel stand pipe, an intermediate portion of which is broken away to conserve space and permit showing the parts on a larger scale, and a brass valve chamber attached to the pipe's lower end, the said valve chamber containing the reciprocable rubber valve element with which my invention is particularly concerned, and Fig. 2 is an enlarged vertical section on line 2—2 of Fig. 1, showing my new valve construction.

The same reference numerals are applied to corresponding parts in these two views.

Referring to the drawing, it is old in frost-proof yard hydrants to have a cast iron head, like that shown at 3, threaded on the upper end of a stand pipe 4, the latter projecting above the ground to a suitable level so that the spout 5 will clear large containers, such as milk cans, and for convenient connection of a hose on the threaded end of the spout, and extending down into the ground far enough to locate the brass valve chamber 6, that is threaded on its lower end, below the frost line. Due to the low elevation of the valve chamber 6 there is no danger of water in said chamber freezing and interfering with the freedom of reciprocatory movement of valve 7 with control rod 8, and closing up the drain hole 9 provided in the wall of said chamber and communicating with the bore 10 wherein the valve 7 is operable. Water left in the stand pipe 4 when the hydrant is shut off is automatically drained off through the hole 9 so that the hydrant is assured of being in good working order at all times regardless of freezing temperatures. The control rod 8 is of galvanized steel, like pipe 4, and has its upper end extending through a stuffing box 10 and pivotally connected by a clevis 11 and link 12 with a control handle 13, that is pivotally mounted on the head 3, as at 14, and is arranged to be locked releasably in shut off position by means of a toothed catch 15. The latter is pivoted at 16 on the head 3 and unbalanced in the direction of the handle 13, so as to lock automatically on a keeper projection 17 on the lower end of handle 13 when the hydrant is shut off but be easily unlockable by pressure inwardly on the upwardly reaching finger projection 18 when the hydrant is to be turned on. The other downwardly reaching finger projection 19 limits clockwise turning of catch 15.

The valve 7, in accordance with my invention, has the generally cylindrical, elongated body thereof of one-piece molded rubber construction, with a brass connection plug 20 molded therein and bonded to the rubber. The inner end of the plug 20 is enlarged abruptly to form an annular flange as indicated at 21 to provide an extra anchorage means for this plug. The plug has a threaded hole 22 in which the threaded lower end of rod 8 is threaded tightly. There is nothing on the valve, therefore, to get loose and drop off, such as the separate valve rubber and the usual retaining screw and washer, employed in earlier designs, and, hence, since the valve 7 is removable intact with the control rod 8 upon removal of head 3 whenever the valve 7 requires replacement, there is never any necessity for digging up or disturbing the valve chamber 6 or stand pipe 4. The lower end 23 of the cylindrical rubber body of valve 7 is of semi-spherical form and fits with a water tight sealing action a semi-spherical valve seat 24 provided in the chamber 6 in the lower end of bore 10 around the inlet port 25. The lower end of chamber 6 is open and threaded, as indicated at 26, for connection with the water supply system pipe (not shown). Opening into bore 10 and spaced above seat 24 are radial outlet ports 27 which open into the annular chamber 28 inside the fitting 6. The cylindrical tubular shank portion 29 of valve 7, which extends upwardly relative to the plug 20 in radially spaced concentric relation to stem 8, is compressed slightly radially by entry in bore 10 to insure its having a snug sliding fit in said bore to seal the outlet ports 27 in addition to the sealing of inlet port 25 by the end 23 of the valve when the valve is closed. In the closed position, valve 7 leaves drain hole 9 uncovered for drainage of water from the stand pipe 4, as appears in Fig. 2. The shank portion 29 in the open position of valve 7 covers and tightly seals drain hole 9 so that there can be no loss of water and pressure out the drain when the hydrant is open. The present valve construction also affords the advantage that there is a sufficient thickness of rubber in the valve between the valve seat 24 and the insert 20 to enable appreciable endwise compression of the valve when it is pressed down against the seat and thereby insure seating the valve under a predetermined pressure and avoid likelihood of slow leakage of water out the drain and danger of water rising to a freezing level in the stand pipe and putting the faucet out of commission until it is thawed out. The catch 15 is preferably so arranged that a perceptible amount of endwise compression of valve 7 is necessary to engage catch on tooth 17, whereby handle 13 is locked resiliently in shut off position.

It is believed the foregoing description conveys a good understanding of the objects and advantages of my invention. The appended claim has been drawn to cover all legitimate modifications and adaptations.

I claim:

As an article of manufacture, a valve element comprising a one piece, generally cylindrical, elongated body of molded, compressible, resilient, rubber-like material, said body being elongated to the extent that its diameter is small in relation to its overall length, said body having in the center thereof, approximately midway of its length, a substantially cylindrical metallic insert of a radius approximately half the radius of said body and having a threaded axial hole provided therein into which the end of a valve control rod is adapted to be threadedly connected for manipulation of the valve, said body having the one end portion thereof formed substantially semispherical to serve as a compressible seating end that is compressible endwise of said body when the valve is seated, and the other end portion of said body outwardly from the insert being hollow so as to provide a tubular radially compressible and radially expansible cylindrical shank portion in radially spaced relation to the valve control rod, the wall thickness of said tubular portion being small in relation to the length of its extension from said insert.

References Cited in the file of this patent

UNITED STATES PATENTS

| | | |
|---|---|---|
| 650,179 | Knox | May 22, 1900 |
| 754,186 | Arendt | Mar. 8, 1904 |
| 934,082 | Martin | Sept. 14, 1909 |
| 983,144 | Juagensen | Jan. 31, 1911 |
| 994,955 | Sayre | June 13, 1911 |
| 1,050,033 | Martin | Jan. 7, 1913 |
| 1,606,191 | Siebenmann | Nov. 9, 1926 |
| 1,764,991 | Siebs | June 17, 1930 |
| 1,947,257 | Fritz | Feb. 13, 1934 |
| 2,105,487 | Lozon | Jan. 18, 1938 |
| 2,106,176 | Huffman | Jan. 25, 1938 |
| 2,173,529 | Beecher | Sept. 19, 1939 |
| 2,202,735 | Johnson | May 28, 1940 |
| 2,397,269 | Kelly | Mar. 26, 1946 |
| 2,410,105 | Remus | Oct. 29, 1946 |
| 2,598,708 | McGarry et al. | June 3, 1952 |